Oct. 5, 1943.  J. V. MARTIN  2,331,212
EASY RIDING TIRE
Filed Dec. 31, 1940  3 Sheets-Sheet 1
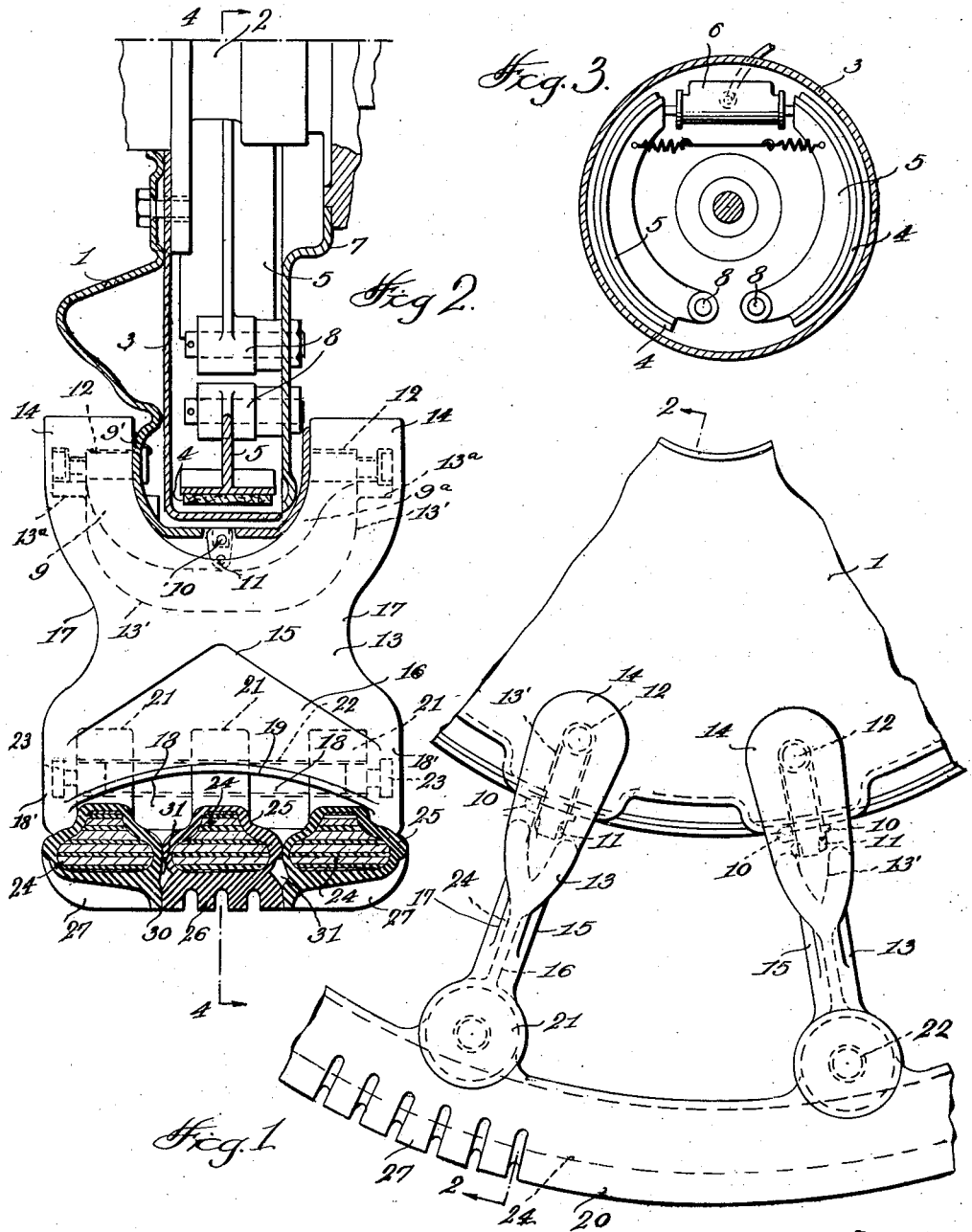
Inventor
James V. Martin
Jas. F. Martin
By
Attorney Oct. 5, 1943.    J. V. MARTIN    2,331,212
EASY RIDING TIRE
Filed Dec. 31, 1940    3 Sheets-Sheet 2
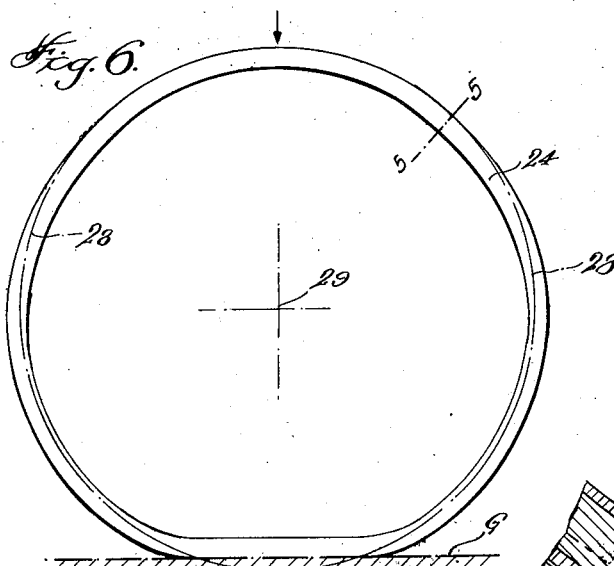
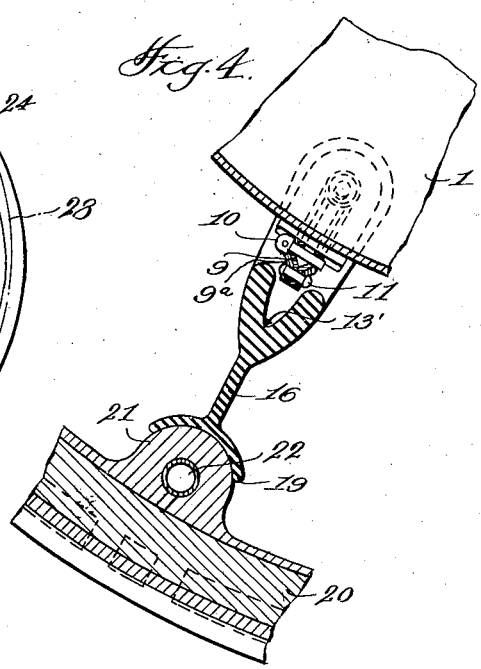
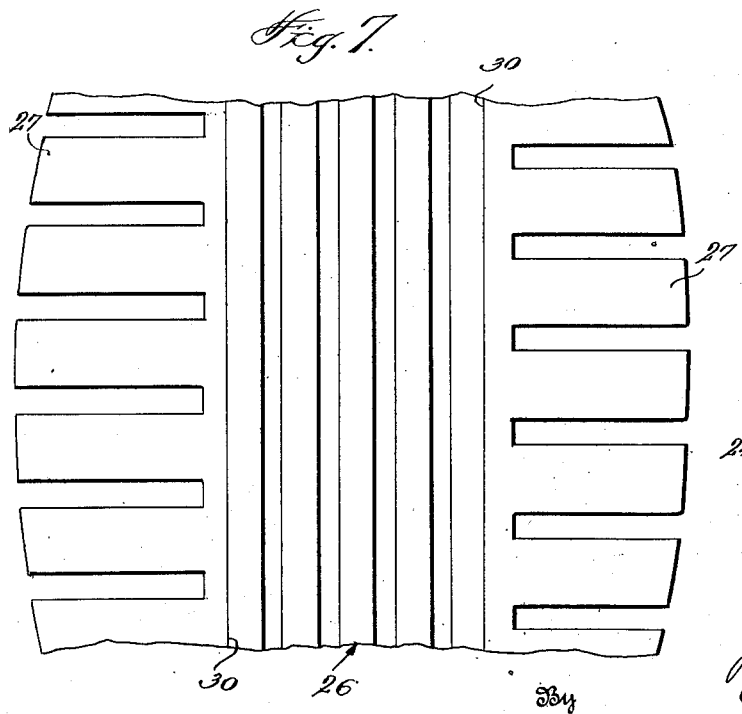
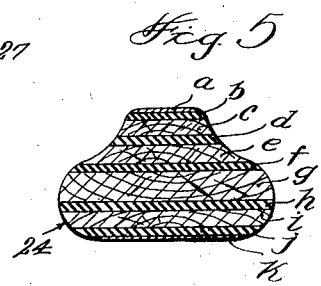
Inventor
James V. Martin
Jas. V. Martin
By
Attorney Oct. 5, 1943.   J. V. MARTIN   2,331,212
EASY RIDING TIRE
Filed Dec. 31, 1940   3 Sheets-Sheet 3
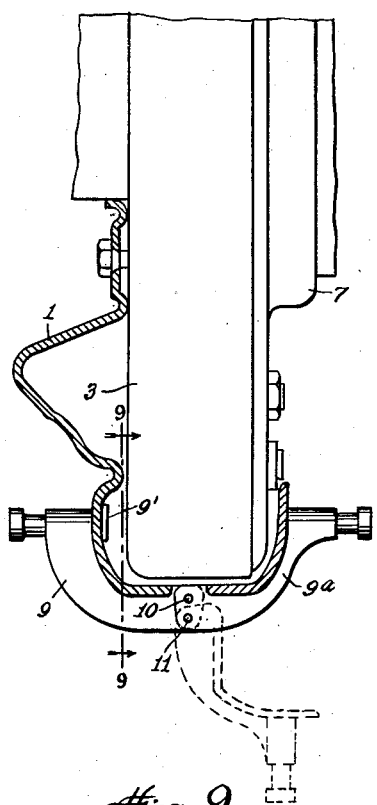
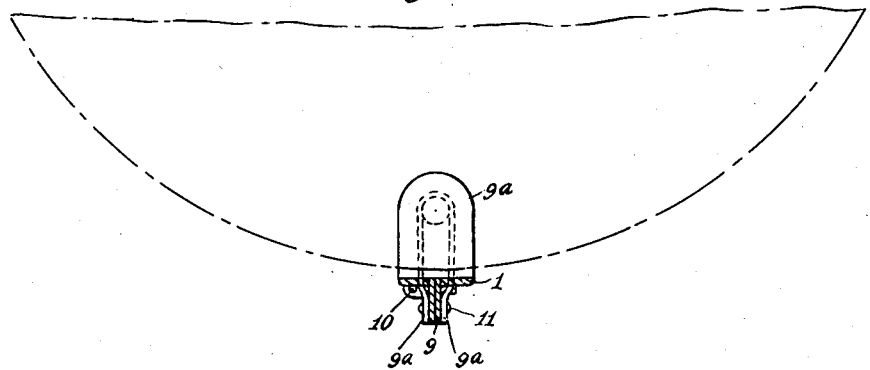

Patented Oct. 5, 1943

2,331,212

UNITED STATES PATENT OFFICE 2,331,212

EASY RIDING TIRE

James V. Martin, Rochelle Park, N. J.

Application December 31, 1940, Serial No. 372,628
In Great Britain January 8, 1940

9 Claims. (Cl. 152—7)

The primary purpose of my invention is to provide an easier riding and safer type of tire and one which will not require a spare tire for change over on the road.

A further object is to provide a type of tire which will permit control of an automobile over rough roads at higher speeds than are possible with inflated tires and a still further object is to provide a comparatively cool tire at high speeds.

Still further objects are to provide a flexible type of tire for climbing curbs or tracks at small angles and to hold and conform to the road while delivering less violence to the axles over bumps in the road.

With the above in mind the still further objects of my invention will become apparent as one follows the following description reference being had to the several views of the drawings:

Fig. 1 shows a sector of my invention attached to a vehicle wheel; the view being in side elevation.

Fig. 2 is a view partly in section taken along the line 2—2 of Fig. 1.

Fig. 3 is a view reduced in size showing typical brake assembly such as one would see looking toward the inside of the wheel assembly of Fig. 2.

Fig. 4 is a view partly in section taken along the line 4—4 of Fig. 2 and omitting the brake assembly.

Fig. 5 is a full scale cross sectional view of one of the composite fillers used in my invention and Fig. 6 indicates how such a filler deflects under load: Fig. 5 is taken on the line 5—5 of Fig. 6. Fig. 7 is a sketch made from an imprint of my type tire on the road and under load.

Figs. 8 and 9 show the bracket 9 and its connections to the wheel 1.

Proceeding now to the more detailed description of my invention like numerals will refer to similar parts throughout the several views: 1 indicates an automobile wheel mounted on a hub portion 2 and located outwardly of a brake drum 3, while 4 indicates brake bands mounted on typical brake shoes 5 for "inside" type brakes while 6 indicates a hydraulic type of brake setting mechanism.

7 indicates a "back" plate which protects the braking mechanism and carries the journals 8 for the brake shoes.

9 indicates in dotted lines a transverse bracket secured to the disc wheel 1 at 9' and having a pivoted portion 9a which extends from the pin 10 and the pivot 11 around the end of the brake drum 3 to a position inwardly of the brake assembly. 12 indicates a button headed extension of the bracket 9 and 13 illustrates a rubber molded tire spoke molded to fit over the said bracket 9 and its button headed portions 12. A dotted line 13' indicates the radially outer end of the molded opening in the spoke 13 and dotted lines 13a indicate the radially outer ends of such molded openings radially outward of the button heads themselves.

The tire spoke 13 is of molded rubber and in addition to its radially inner part which has molded loops 14 formed to fit over the bracket 9 the spokes have thickened portions 15 which cross each other diagonally and a web portion 16 and lateral beads 17 and outer lugs 18, as well as an outer bead 19. The outer or tread portion of my tire is made up of 3 tread hoops 20 in three different forms and each said hoop is united to the spokes of my tire by lugs 21, which intermesh with the spoke lugs 18 and both sets of lugs are held in a constant interlocking position by means of a pin 22, made in its central portion of light steel tubing into which is press fitted at each end an aluminum button head 23 which fits into a molded aperture in each spoke end lug 18'. A hickory pin may be substituted for 22 and 23. All parts of the spokes are protected from curb contacts by lying inwardly laterally of the outermost portions of the tread envelope, see 25 in Fig. 2.

Each tread hoop has a core or filler 24 which is cured to and within a rubber envelope 25 and this carries a tread 26 ribbed circumferentially for the center hoop and a transversely ribbed tread 27 for the outer hoops: It will be noted that these outer hoops can be molded in the same mold and turned so that their curved portions lie toward the lateral margins of the tire. The curved and cross ribbed treads facilitate climbing curbs and car tracks at small angles and when a load is applied unevenly to the three tread hoops, each hoop is free to assume a different position within the limits of the rubber lugs 18 and 21 and the pin 22 in those lugs; for illustration see Fig. 25 of my Patent No. 2,283,274, issued May 19, 1942.

The fillers cured within my tire hoops are of special construction designed to give them great flexibility combined with great strength and the ability to flex often under heavy loads without breaking through flexing fatigue.

All of the axle loads are carried in tension through the upper spokes of my tire to the tread hoops through the flexible lugs and the fillers carry these loads flexibly down to the ground.

Each of my rubber spokes 13 is assembled onto the vehicle wheel under initial tension more than sufficient to care for the static loads: Furthermore the slotted construction of the inner portions 14 of my spokes prevents them from taking any compression loads even in severe bumps.

The initial tension of my spokes adds greatly to the strength of my fillers 24 because under road loadings the weakest positions of my hoops is about half way from the ground to the tops of the said hoops. In Fig. 6 G indicates the ground or road and a broken line 28 indicates a true circle around the point 29: The other two lines indicate one of my fillers 24 under normal working loads and it will be observed that toward the top of the circle the outside of the filler 24 is curved about the same as the true circle, but bulges outwardly toward the horizontal diameter and lower down in spite of the inward pull exerted by the initially tensioned spokes and when the filler approaches the ground it takes a shape which conforms to the ground for a considerable distance, thus forming a flat plane ground contact of considerable area. Fig. 7 is a sketch made from an actual imprint of one of my tires under load: 30 indicates the separation lines between the hoops. And the hollow spaces 31, molded into the rubber envelopes help to make a firm wedging of the contacting treads so that no stones enter at the lines 30.

In order to secure a strong, light and yet flexible filler for my tires I resort to construction illustrated in Fig. 5. This shows at approximately full scale a filler for a 28 inch outside diameter tire of about 6 inch width. Starting from the upper layer of the filler as shown in Fig. 5, which is the inside layer of the filler, I show a steel band $a$ of approximately $\frac{1}{32}$" thickness, this is cured securely to $\frac{1}{16}$" layer $b$ of rubber which prevents its crinkling under compression loads and it must be remembered that at the horizontal diameter of the filler, see Fig. 6, the point of highest loading, the compression loads are on the insides of the fillers or at $a$, while the highest tension loads are on the outsides of the fillers or at $k$ of Fig. 5. $k$ is also of high grade steel and well bonded to $\frac{1}{16}$" of rubber $j$. The intermediary layers or plies $c$, $e$, $g$, and $i$ are of fibrous material such as hickory and a special latex bonding material is used to make sure the rubber layers or plies $b$, $d$, $f$, $h$ and $j$ are cured thereto by a strong bond.

The amount of ground bearing surface desired in the tire can be regulated by the amount of rubber between the layers of wood and steel together with the number of spokes employed, their amount of initial tension and whether hard or softer rubber compounds be employed. Also the softness of the compounds employed between the layers of hickory have an appreciable effect on the fillers' flexibility.

Hickory may be used either solid and steam bent into a filler or laminated from hickory strips with casein glue or other forms of bond, but I find that the outer layers of hickory, i. e., for example, tend to fracture in tension at the horizontal diameter through 29 of Fig. 6 and by bonding a very thin (I show $\frac{1}{64}$") band $k$ of spring steel to rubber outside the hickory the breaking is greatly retarded or entirely stopped depending on the life desired for the fillers. The relatively thicker steel on the inside of each hoop filler, see $a$ in Fig. 5, is better adapted to resist the crinkling of thin steel under compression loads but the bonding of the steel to rubber prevents this crinkling, especially if the compression and tension members of a steel truss are disposed as shown in Fig. 5, i. e., having the tension member and the compression member (latter too light by itself) spaced apart by such material as hickory, and firmly bonded to each other through intervening rubber of virtual tread rubber consistency. The trick or "art" in such a truss consists of regulating the compound and thickness of rubber backed by just enough wood to obtain maximum yieldable strength for weight and mass of material. In other words, if the layer of rubber is made too thick or too soft, even with good bonding it will not prevent fatal crinkling of the compression member of the truss: Also the rubber-steel combination on the tension or ($k$) side of the truss must be adapted by proximity, toughness and bonding to prevent the fracture from tension of the fibrillose material which spaces the steel truss members apart: The strongest possible truss structure would call for a wood to wood lamination with strong glue in the layers $d$, $f$, and $h$; the next best strength/weight ratio can be obtained by omitting layers $d$, $f$, and $h$ of rubber and using steam bent hickory as the spacer, but to provide for a very flexible filler the form shown permits a radial movement of one hickory layer relative the others because of the interposed rubber, and increasing the amount of rubber or the softness of its compounding aids the flexibility.

It will be seen that larger brake diameter are made possible by my novel tire spoke attachments to the vehicle wheel, which allows a comparatively large vertical spoke flexibility for the tire and at the same time allows large brake diameters while producing a fanning air action to cool the brakes. For additional information respecting elastic spoke tires reference should be had to my Patents Nos. 1,954,214, 2,016,095, 2,050,352, and to my copending applications Serial Nos. 236,103, filed October 20, 1938, and issued as Patent No. 2,283,274, and 27,603, filed June 20, 1935, and issued as Patent No. 2,235,378, as well as 319,539, filed February 17, 1940, and issued October 6, 1942, as Patent No. 2,298,142.

The wheel 1, see Fig. 2, is readily demountable in conventional manner, but before attempting its removal from the hub-brake assembly the pins 10 should be pulled out of the brackets 9 thus allowing the inner part 9a of these brackets to swing outwardly around the pivot 11 under the initial tension influence of the spoke 13: The center of the spoke 13 is easily bendable and in this way all obstruction to demounting the wheel can be eliminated while leaving a very large diameter brake assembly undisturbed and attached to the vehicle hub.

It will be evident that my invention can be applied in various ways and I do not care to be limited to the specific embodiment used herein to illustrate the invention.

What I claim is:

1. A tire, wheel and brake assembly including a union between the said tire and wheel, the said brake located radially beyond and laterally between the inner portions of the said tire.

2. A tire, wheel and brake assembly according to claim 1 and spokes having diagonally crossed parts and having inner bifurcated portions, one such portion of each spoke located laterally on one side of the said brake assembly and the other of such spoke portions located symmetrically on the other side of the said brake assembly.

3. A vehicle wheel, tire and brake drum combination wherein the brake drum and wheel are attached to a wheel hub and the inner portions of the said tire are attached to the said wheel at points laterally on both sides of the said drum and less distant from the said hub than the most distant points of the said drum; and means whereby the said wheel with the tire mounted thereon can be demounted from the said hub brake assembly without disturbing the latter.

4. A tire and wheel assembly for vehicles including flexible spokes carrying the loads in tension from the upper portions of flexible tread hoops; the outermost of said hoops on both sides of the tire having transverse tread grooves and a rounded contour extending from the ground contacting portion to points lying laterally beyond a plane containing the outermost points of the said spokes.

5. A tire carrying its loads through tension members from the upper portions of flexible tread hoops and means located at the radially and laterally outer portions of the said tension members to connect the same with the tread hoops, each of the said hoops capable of a limited yieldable upward movement relative an adjacent hoop in the region of ground contact and having a curved contour from the ground contacting portion to positions laterally beyond the said tension member connections, whereby an outer of the said hoops can climb a curb by a limited independent movement relative an adjacent hoop and serve as a protection against curb contact for the said tension member connection.

6. The combination in an elastic spoke type tire, of flexible tread hoops lying outwardly of and attached to the said spokes, a composite filler within a tread envelope of each said hoop and said filler including bands of steel each bonded to rubber and spaced apart from each other by alternate layers of wood and rubber, the said steel being substantially thinner than either the said layers of wood or rubber and bonded to a layer of rubber.

7. In combination with a tire tread a filler therefor including two comparatively thin bands of steel spaced apart from each other by alternate layers of rubber and fibrillose material, each said layer of rubber bonded to an envelope surrounding the said bands of steel and said fibrillose material.

8. In combination with a vehicle wheel and tire, a tread hoop adapted to carry loads from the said wheel delivered to its upper portion through tension members, said hoop including a laminated filler of alternate layers of rubber and wood composing the central portion thereof and two comparatively thin bands of steel bonded within and surrounded by rubber and forming the innermost and outermost laminations of the said filler.

9. The combination in a tire tread hoop of a filler made up in its central portion of layers of wood bonded to comparatively thinner layers of rubber and an outermost layer of very thin metal bonded to one of the said layers of rubber, the said filler located within a tread envelope.

JAMES V. MARTIN.